United States Patent
Orji et al.

(10) Patent No.: US 11,175,425 B2
(45) Date of Patent: Nov. 16, 2021

(54) SURVEY DESIGN FOR DATA ACQUISITION USING MARINE NON-IMPULSIVE SOURCES

(71) Applicant: PGS Geophysical AS, Oslo (NO)

(72) Inventors: Okwudili Orji, Oslo (NO); Walter F. Söllner, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 319 days.

(21) Appl. No.: 16/224,345

(22) Filed: Dec. 18, 2018

(65) Prior Publication Data
US 2019/0187315 A1 Jun. 20, 2019

Related U.S. Application Data

(60) Provisional application No. 62/599,969, filed on Dec. 18, 2017.

(51) Int. Cl.
| | | |
|---|---|---|
| *G01V 1/38* | (2006.01) | |
| *G01V 1/28* | (2006.01) | |
| *G01V 1/30* | (2006.01) | |
| *G01V 1/04* | (2006.01) | |
| *G01V 1/00* | (2006.01) | |

(52) U.S. Cl.
CPC ............ *G01V 1/3808* (2013.01); *G01V 1/005* (2013.01); *G01V 1/04* (2013.01); *G01V 1/282* (2013.01); *G01V 1/305* (2013.01); *G01V 1/3861* (2013.01); *G01V 2210/6222* (2013.01)

(58) Field of Classification Search
CPC .......... G01V 1/3808; G01V 1/04; G01V 1/00; G01V 1/3861; G01V 1/282; G01V 1/305; G01V 2210/6222
See application file for complete search history.

(56) References Cited

U.S. PATENT DOCUMENTS

| | | | |
|---|---|---|---|
| 5,511,039 A | 4/1996 | Flentge | |
| 5,598,378 A | 1/1997 | Flentge | |
| 7,257,049 B1 | 8/2007 | Laws et al. | |
| 9,134,442 B2 * | 9/2015 | Dellinger | G01V 1/345 |
| 9,702,991 B2 * | 7/2017 | Dellinger | G01V 1/04 |
| 10,288,753 B2 * | 5/2019 | Poole | G01V 1/38 |
| 10,359,528 B2 * | 7/2019 | van Borselen | G01V 1/3861 |
| 2011/0032795 A1 * | 2/2011 | Kragh | G01V 1/32 367/21 |
| 2012/0147699 A1 * | 6/2012 | Dellinger | G01V 1/005 367/15 |
| 2012/0155217 A1 * | 6/2012 | Dellinger | G01V 1/345 367/38 |
| 2014/0034257 A1 | 2/2014 | Nakayama et al. | |
| 2014/0036623 A1 * | 2/2014 | Poole | G01V 1/3808 367/16 |

(Continued)

*Primary Examiner* — Douglas Kay

(57) ABSTRACT

Survey design for data acquisition using marine non-impulsive sources can include operating a first marine non-impulsive source at over a first frequency range for a first sweep length and operating a second marine non-impulsive source over a second frequency range for a second sweep length. The first sweep length can be based on available geological information of a subsurface location that is a target of a marine seismic survey, an intended speed of a marine survey vessel, and the first frequency range. The second sweep length can be based on the available geological information, the intended speed, and the second frequency range.

31 Claims, 8 Drawing Sheets

(56) References Cited

U.S. PATENT DOCUMENTS

| | | | |
|---|---|---|---|
| 2015/0092517 A1* | 4/2015 | Dellinger | G01V 1/04 367/15 |
| 2016/0047929 A1* | 2/2016 | Hegna | G01V 1/36 367/24 |
| 2016/0187513 A1* | 6/2016 | Poole | G01V 1/38 702/16 |
| 2017/0176636 A1 | 6/2017 | Adams et al. | |
| 2017/0192116 A1* | 7/2017 | Beasley | G01V 1/36 |
| 2017/0235000 A1* | 8/2017 | Cocker | G01V 1/282 702/16 |
| 2017/0371056 A1 | 12/2017 | Toennessen et al. | |

* cited by examiner

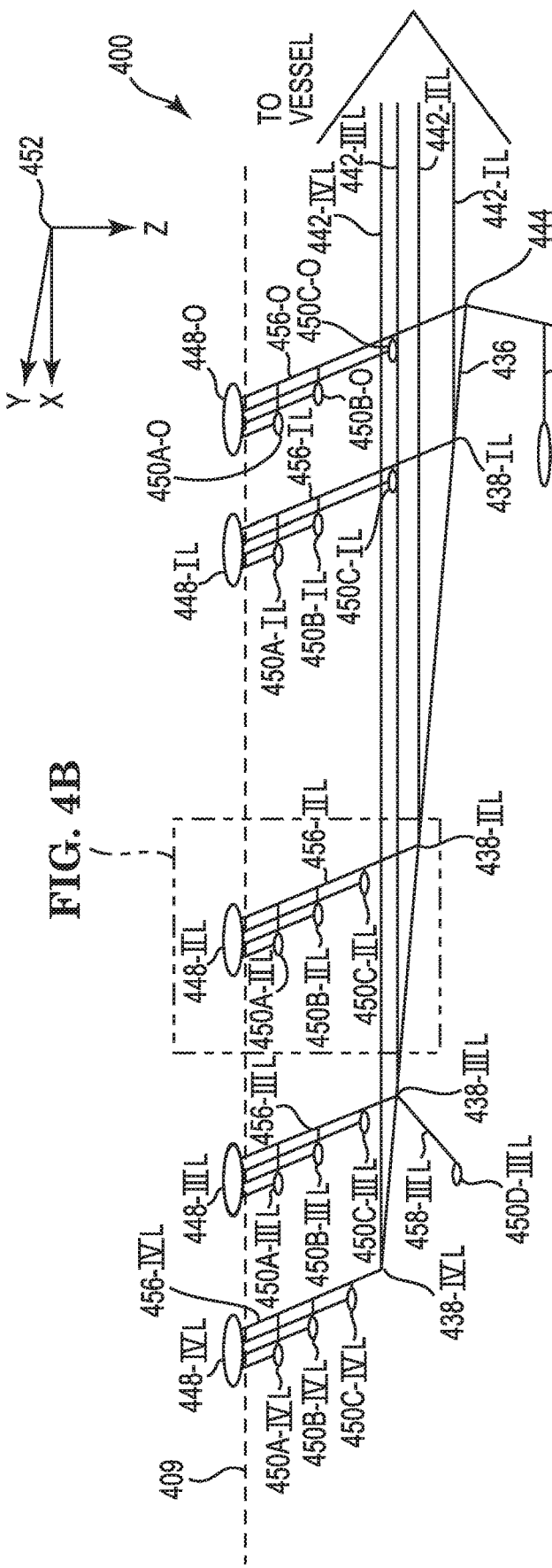

564 — OPERATING A FIRST MARINE NON-IMPULSIVE SOURCE OVER A FIRST FREQUENCY RANGE ON A FIRST SPATIAL SAMPLING FOR A FIRST SWEEP LENGTH, WHEREIN THE FIRST SWEEP LENGTH IS BASED ON AVAILABLE GEOLOGICAL INFORMATION OF A SUBSURFACE LOCATION COMPRISING A TARGET OF A MARINE SEISMIC SURVEY, AN INTENDED SPEED OF A MARINE SURVEY VESSEL, THE FIRST SPATIAL SAMPLING, AND THE FIRST FREQUENCY RANGE

566 — OPERATING A SECOND MARINE NON-IMPULSIVE SOURCE OVER A SECOND FREQUENCY RANGE ON A SECOND SPATIAL SAMPLING FOR A SECOND SWEEP LENGTH, WHEREIN THE SECOND SWEEP LENGTH IS BASED ON THE AVAILABLE GEOLOGICAL INFORMATION, THE INTENDED SPEED, THE SECOND SPATIAL SAMPLING, AND THE SECOND FREQUENCY RANGE

FIG. 5

SURVEY DESIGN FOR DATA ACQUISITION USING MARINE NON-IMPULSIVE SOURCES

CROSS-REFERENCE TO RELATED APPLICATIONS

This application claims priority to U.S. Provisional Application 62/599,969, filed Dec. 18, 2017, which is hereby incorporated by reference as if entirely set forth herein.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources below the sea surface and over a subterranean formation to be surveyed. Marine survey receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more marine survey sources, which can be impulsive sources such as air guns, non-impulsive sources such as marine vibrator sources, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The marine survey receivers thereby measure a wavefield that was initiated by the actuation of the marine survey source.

BRIEF DESCRIPTION OF THE DRAWINGS

FIG. 4A illustrates a low perspective cutaway view of an exemplary embodiment of a marine survey system.

FIG. 5 illustrates an exemplary embodiment of a method flow diagram for survey design for data acquisition using marine non-impulsive sources.

DETAILED DESCRIPTION

Figure 1:
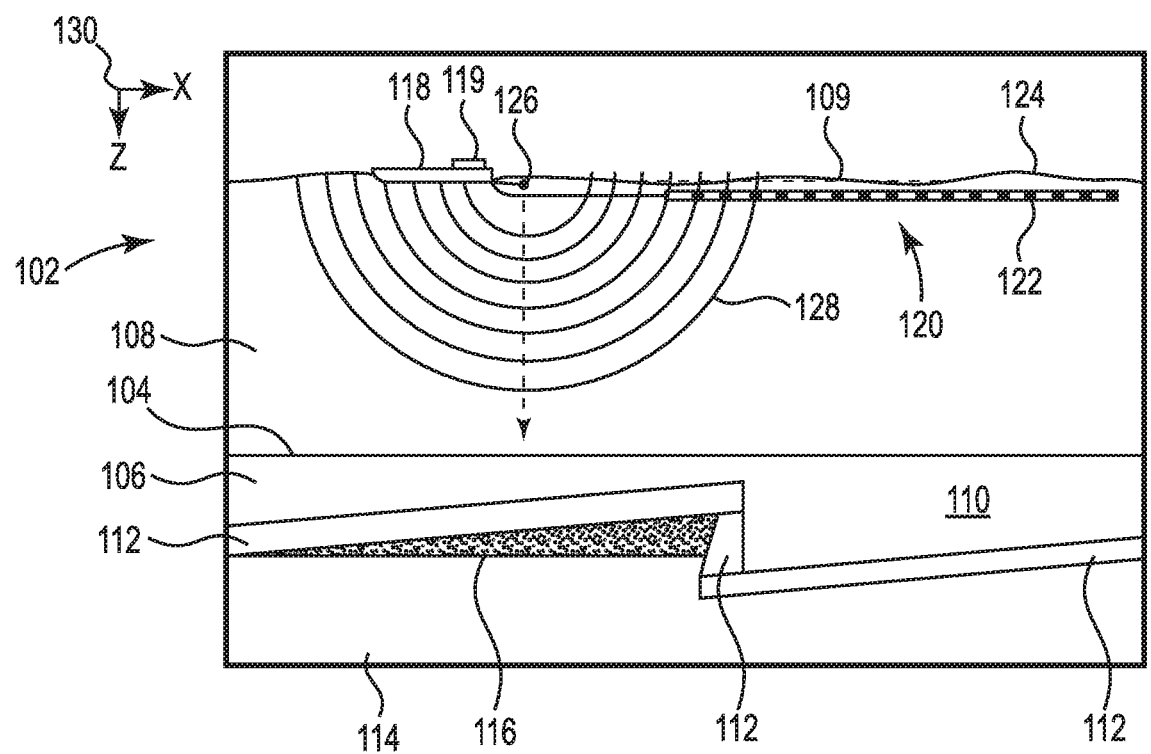
FIG. 1 illustrates an elevation or xz-plane view of an example marine survey in which signals are emitted by a marine survey source for recording by marine survey receivers.

The present disclosure is related to survey design for data acquisition using marine non-impulsive sources. A marine seismic source is a device that generates controlled acoustic energy used to perform marine seismic surveys based on reflection and/or refraction of the acoustic energy. Marine seismic sources can be marine impulsive sources or marine non-impulsive sources. Examples of marine impulsive sources include air guns, water guns, explosive sources (e.g., dynamite), plasma sound sources, boomer sources, etc. An example of a marine non-impulsive source is a marine vibrator. A marine vibrator can include at least one moving plate. The marine vibrator can be controlled with a time signal that controls motion of the at least one plate of the marine vibrator source. For example, where the signal produced by the motion of the plate can be described as a sweep (where the frequency changes with time), the time signal can be referred to as a sweep signal. An example of a marine vibrator source is a bender source, which is a flexural disc projector. A bender source may employ one or more piezoelectric elements, such that the mechanical vibration of the bender source is driven by piezoelectric distortion based on electrical energy applied to the piezoelectric element. Marine impulsive sources are typically not able to generate acoustic energy at low frequencies As used herein, a "low frequency" includes frequencies from approximately 1 Hertz (Hz) to approximately 8 Hz, or in some cases (as, for example, impulsive source technology improves) frequencies from approximately 1 Hz to approximately 4 Hz. A marine non-impulsive source can generate acoustic energy over a frequency range, including low frequencies. A sweep signal for a marine non-impulsive source can be used to generate energy at low frequencies from the marine non-impulsive source with a desired signal to noise ratio where marine impulsive sources are not practical to generate sufficient energy. The marine non-impulsive source may be swept over a frequency range. This technique may result in energy spread out with the sweep and less environmental impact than using a marine impulsive source such as air guns or dynamite.

Marine surveys can be designed based on available geological information of a subsurface location that is the target of the marine survey. Examples of such geological information include a Q-factor associated with the subsurface location, a speed of sound associated with the subsurface location, and a two-way travel time associated with the subsurface location. The two-way travel time is the time for the wavefield to travel from the seismic source to the target and back to the marine survey receiver. A Q-factor may also be referred to in the art as a seismic quality factor and can be represented as the inverse of an anelastic attenuation factor. The anelastic attenuation factor quantifies the effects of anelastic attenuation of the energy generated by a seismic source caused by fluid movement and grain boundary friction. As a seismic wave propagates through a medium, the elastic energy associated with the wave is gradually absorbed by the medium. The Q-factor can be conceptualized as a measure of the fraction of energy generated by a seismic source that is lost. Since higher frequencies are attenuated by Q-factor at shallower subsurface locations, shorter sweeps of higher frequency bandwidth can be designed for these targets while longer sweeps of lower frequency bandwidths can be designed for deeper subsurface locations. The distribution in frequency bandwidth and sweep length depends on the Q-factor. The available time is the sum of the sweep length and two-way travel time and can be determined based on the deepest subsurface location that is a target of the marine seismic survey. Sweep signals of limited frequency bandwidth can be designed based on the geological information to improve imaging of the subsurface location. Limited frequency bandwidth sweep signals can allow the marine survey vessel conducting the marine survey to travel at faster speeds.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected and, unless stated otherwise, can include a wireless connection.

The figures herein follow a numbering convention in which the first digit or digits correspond to the drawing figure number and the remaining digits identify an element in the drawing. Similar elements between different figures may be identified by the use of similar digits. For example, 118 may reference element "18" in FIG. 1, and a similar element may be referenced as 218 in FIG. 2. Analogous elements within a Figure may be referenced with a hyphen and extra numeral or letter. See, for example, elements 232-1, and 232-2 in FIG. 2. Such analogous elements may be generally referenced without the hyphen and extra numeral or letter. For example, elements 232-1 and 232-2 may be collectively referenced as 232. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an elevation or xz-plane 130 view of marine surveying in which signals are emitted by a marine survey source 126 for recording by marine survey receivers 122. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, underlying rock layer 114, and hydrocarbon-saturated layer 116. One or more components of the subsurface volume 106, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which marine survey receivers may be coupled. In one type of marine survey, each marine survey receiver, such as the marine survey receiver 122 represented by the shaded disk in FIG. 1, comprises a pair of sensors including a geophone that detects particle displacement within the water by detecting particle motion variation, such as velocities or accelerations, and/or a hydrophone that detects variations in pressure. In one type of marine survey, each marine survey receiver, such as marine survey receiver 122, comprises an electromagnetic receiver that detects electromagnetic energy within the water. The streamers 120 and the marine survey vessel 118 can include sensing electronics and data-processing facilities that allow marine survey receiver readings to be correlated with absolute positions on the sea surface and absolute three-dimensional positions with respect to a three-dimensional coordinate system. In FIG. 1, the marine survey receivers along the streamers are shown to lie below the sea surface 109, with the marine survey receiver positions correlated with overlying surface positions, such as a surface position 124 correlated with the position of marine survey receiver 122. The marine survey vessel 118 can include a controller 119, which is described in more detail with respect to FIG. 6. For example, the controller 119 can operate a first marine non-impulsive source at a first depth over a first frequency range for a first sweep length and operating a second marine non-impulsive source at a second depth over a second frequency range for a second sweep length as described herein.

The marine survey vessel 118 can tow one or more marine survey sources 126 that produce signals as the marine survey vessel 118 and streamers 120 move across the sea surface 109. Although not specifically illustrated, the marine survey sources 126 can include a plurality of marine non-impulsive sources above, below, or at the same depth as the streamer 120. Marine survey sources 126 and/or streamers 120 may also be towed by other vessels or may be otherwise disposed in fluid volume 108. For example, marine survey receivers may be located on ocean bottom cables or nodes fixed at or near the surface 104, and marine survey sources 126 may also be disposed in a nearly-fixed or fixed configuration. For the sake of efficiency, illustrations and descriptions herein show marine survey receivers located on streamers, but it should be understood that references to marine survey receivers located on a "streamer" or "cable" should be read to refer equally to marine survey receivers located on a towed streamer, an ocean bottom receiver cable, and/or an array of nodes.

FIG. 1 shows acoustic energy as an expanding, spherical signal, illustrated as semicircles of increasing radius centered at the marine survey source 126, representing a down-going wavefield 128, following a signal emitted by the marine survey source 126. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

One impediment to using a non-impulsive source as the marine survey source 126 is the use of long sweep lengths for the time signal driving the non-impulsive source. Long sweep lengths for a given frequency range are used to reach a desired energy output or signal-to-noise (SNR) ratio at the subsurface location that is the target of the marine survey. As used herein, a "desired SNR" refers to at least a minimum SNR and includes the minimum SNR and SNRs greater than the minimum SNR (signals with less noise) unless otherwise indicated. The sweep length plus two-way travel time defines the available time for each bin cell in a towed streamer 120 acquisition. A bin is the area between adjacent lines in a surface divided by a grid. Different traces can fall within different bins. The bin size is related to the signal bandwidth and is given by half of the minimal wavelength. For an intended vessel speed and predefined sweep length, this may create frequency drift for the bins (not having all the frequencies in each bin) for vessel speeds that are too high or oversampling for vessel speeds that are too low. This can lead to inefficient data acquisition.

The bin size for a marine seismic survey can be based on the maximum frequency for a given emergence angle. The emergence angle ($\alpha_x$) is the angle formed between the return signal from the subsurface and a line in the z-direction at the receiver. The spatial wavenumber in the x-direction ($k_x$) is a projection of an incoming wave on the x-axis:

$$k_x = 2\pi f p_x = 2\pi f \frac{\sin\alpha_x}{v_0} \quad (1)$$

where $p_x$ is a slowness vector projection on the x-axis, which is the inverse of velocity in the propagation direction of the wave, f is frequency, and $v_0$ is the speed of sound at the receiver level. A sampling consideration can include the Nyquist wavenumber ($k_{x_N}$), which defines the maximum frequency ($f_{max}$) for a given emergence angle:

$$k_{x_N} = \frac{2\pi}{2\Delta x} = 2\pi f_{max} \frac{\sin\alpha_x}{v_0} \quad (2)$$

where $\Delta x$ is the spacing between receivers in the x-direction, such as along a streamer 120. Assuming an emergence angle of 90 degrees:

$$\Delta x = \frac{v_0}{2f_{max}}, \quad (3)$$

which is equivalent to:

$$2\Delta x = v_0 T_{min}, \quad (4)$$

which means that two spatial samples are required per minimum wavelength ($T_{min}$) for alias-free data reconstruction. Sampling considerations can be fulfilled in a common source domain or a common receiver domain, such as for designature or deghosting. Oversampling does not add signal information.

Using available geological information of the subsurface location in the survey design can allow for computation of the effective frequency needed to image the subsurface location. A limited frequency bandwidth can be optimized for imaging the subsurface location and allow optimized sweep lengths to be used. The sweep length is the amount of time that it takes for the marine non-impulsive source to operate through its frequency range. According to at least one embodiment of the present disclosure, rather than using long sweep lengths to cover a broad frequency range for a marine non-impulsive source, shorter sweep lengths are used over different, narrower ranges of frequencies for each of a plurality of different marine non-impulsive sources. For a particular frequency range, if one marine non-impulsive source is insufficient to provide a desired energy output with an optimized sweep length, additional marine non-impulsive sources can be operated within the particular frequency range. With optimized sweep lengths, frequency drift for the bins can be reduced and higher vessel speeds can be achieved, which can reduce the effective data acquisition duration. Such improvements to the technological process of marine seismic surveying can also reduce the cost of data acquisition by reducing the amount of fuel used as well as the time used for data acquisition. Such improvements can also reduce the environmental impact of the marine seismic survey.

Figure 2:
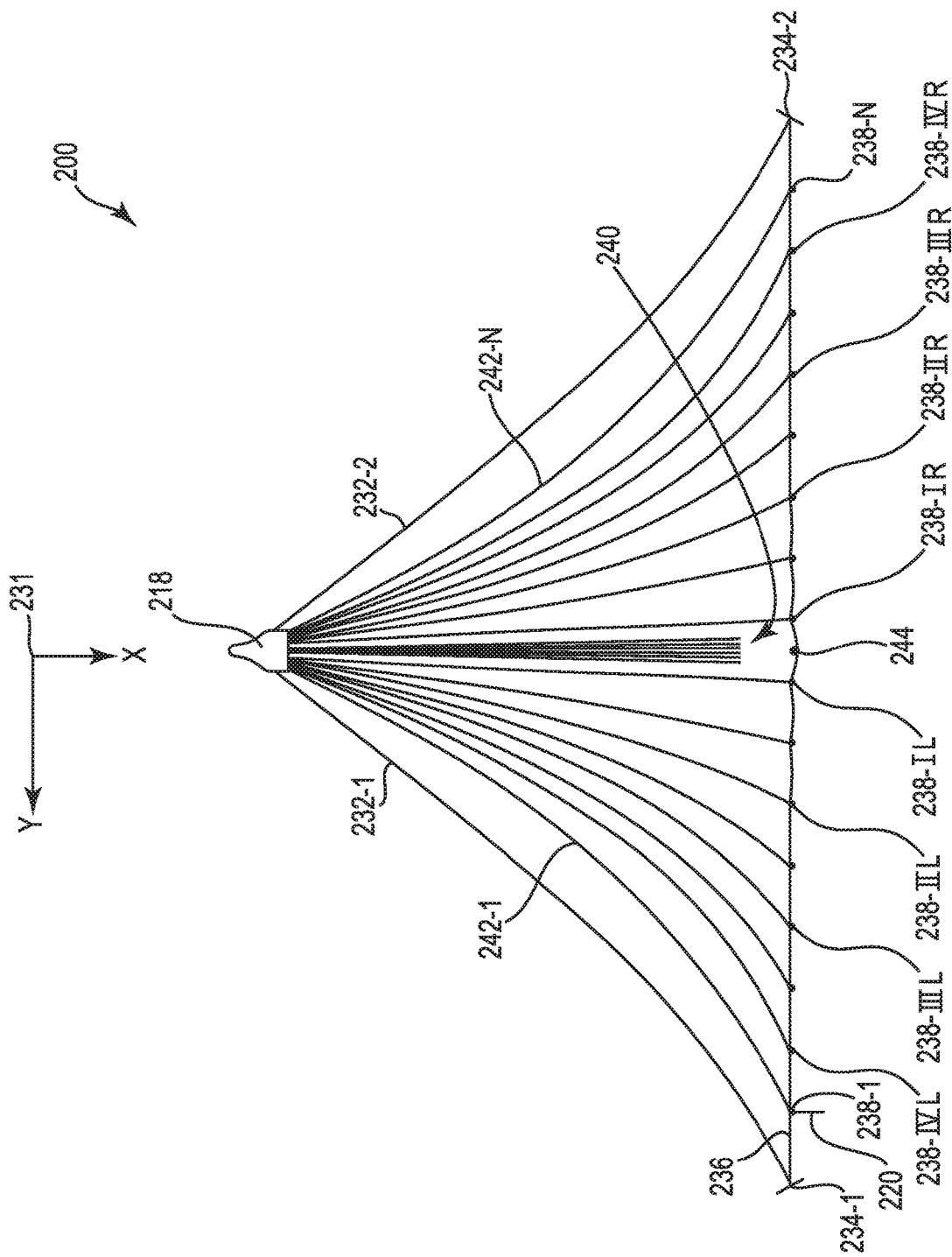
FIG. 2 illustrates a plan view of an exemplary embodiment of a marine survey system.

FIG. 2 illustrates a plan or yx-plane 231 view of an exemplary embodiment of a marine survey system 200. A marine survey vessel 218 can control functions of components of the marine survey system 200, for example via a controller on the marine survey vessel. In at least one embodiment, some components, such as front floats, can have their own electronic control units located on the components themselves. Control can be provided between the marine survey vessel 218 and system components in a wired or wireless fashion.

The marine survey vessel 218 is configured to tow towed objects through the water. Towed objects can include components of the marine survey system 200 such as streamers 220, sources, receivers, or other objects towed by the marine survey vessel 218. The marine survey vessel 218 can tow the towed objects via towing equipment that maintains the towed objects at a desired depth and lateral positions with respect to other towed objects and/or with respect to the marine survey vessel 218. For example, the towing equipment can include floats, buoys, paravanes 234, and various lines and cables, such as a first paravane tow line 232-1 coupled to the marine survey vessel 218 and a second paravane tow line 232-2 coupled to the marine survey vessel 218. Winches (not specifically illustrated) onboard the marine survey vessel 218 can enable changing the deployed length of each paravane tow line 232. The second end of a first paravane tow line 232-1 can be coupled to a first paravane 234-1, and the second end of a second paravane tow line 232-2 can be coupled to second paravane 234-2. A tow line 232 can be coupled to a paravane 234 through a set of lines called a "bridle." The paravanes 234 are each configured to provide a lateral force component to various components of the marine survey system 200 when the paravanes 234 are towed in the water. The combined lateral forces of the paravanes 234 separate the paravanes 234 from each other constrained by one or more spreader lines 236 coupled between the paravanes 234. The paravanes 234 can be coupled directly to the spreader line 236 as illustrated or can be coupled to the spreader line 236 by way of spur lines. As used herein, a paravane 234 can be provided on the side of a marine survey system to maintain a transverse distance (relative to the path of the marine survey vessel 218) between towed objects. The paravane 234 can be connected to the marine survey vessel 218 via lines, and a same or different type of lines can be used to separate various towed objects. In at least one embodiment, the marine survey system 200 does not include paravanes 234.

The towed objects can each be coupled, at the ends nearest the marine survey vessel 218 (i.e., the proximal ends) to a respective lead-in termination 238-1, . . . 238-N. For example, the streamer 220 can be coupled to the lead-in termination 238-1. The lead-in terminations 238 can be coupled to or are associated with the spreader lines 236 so as to control the lateral positions of the towed objects with respect to each other and with respect to the marine survey vessel 218. Electrical, optical, or pneumatic connections, among other types of connections, between the appropriate components in the onboard equipment and the equipment associated with the towed objects may be made using lead-ins 242-1, . . . , 242-N. Like the paravane tow lines 232, each of the lead-ins 242 may be deployed by a respective onboard winch such that the deployed length of each lead-in 242 can be changed. As used herein, a lead-in 242 can be a line that couples towed objects to a marine survey vessel 218. In some instances, towed objects may be coupled to the marine survey vessel 218 via lead-ins indirectly, such as through a connection point 244 to a spreader line. A set of lead-ins that are not specifically labeled in FIG. 2 are coupled to the marine survey vessel 218 and to a group of marine impulsive sources 240. At least one embodiment of the present disclosure can include the use of both marine impulsive sources 240 and marine non-impulsive sources. At least one embodiment of the present disclosure does not include the use of marine impulsive sources 240.

Although not illustrated in FIG. 2, towed objects can be coupled to a front float. As used herein, a front float can use power for a source coupled to the float, for a control and communication unit, winch, bay door, global positioning system (GPS), acoustic pinger, router, an alternative energy source, navigation lights, or a compressor, among others. The coupling to the front float can be at or near a lead-in termination 238 or connection point 244. The front float can be coupled to a source, as described in more detail herein. The extensions to the reference numerals associated with the lead-in terminations 238 designate their position in the marine survey system 200. For example, the extension "-IVL" in the reference numeral "238-IVL" indicates that the lead-in termination 238 is associated with an arbitrarily numbered fourth ("IV") lead-in termination 238 on the left ("L") side of the marine survey vessel 218. Likewise, the extension "-IVR" in the reference numeral "238-IVR" indicates that the lead-in termination 238 is associated with an arbitrarily numbered fourth ("IV") lead-in termination 238 on the right ("R") side of the marine survey vessel 218. This notation is used throughout the Figures herein.

As illustrated in more detail in FIG. 4A, the lead-in termination 238-IVL can be coupled to marine non-impulsive sources operable in different frequency ranges associated with suffixes A, B, and C; the lead-in termination 238-IIIL can be coupled to marine non-impulsive sources operable in different frequency ranges associated with suffixes A, B, C, and D; the lead-in termination 238-IIL can be coupled to marine non-impulsive sources operable in different frequency ranges associated with suffixes A, B, and C; the lead-in termination 238-IL can be coupled to marine non-impulsive sources operable in different frequency ranges associated with suffixes A, B, and C; the connection point 244 can be coupled to marine non-impulsive sources operable in different frequency ranges associated with suffixes A, B, C, D, and E. Although not specifically illustrated in FIG. 4A, the lead-in termination 238-IR can be coupled to marine non-impulsive sources operable in different frequency ranges associated with suffixes A, B, and C; the lead-in termination 238-IIR can be coupled to marine non-impulsive sources operable in different frequency ranges associated with suffixes A, B, and C; the lead-in termination 238-IIIR can be coupled to marine non-impulsive sources operable in different frequency ranges associated with suffixes A, B, C, and D; the lead-in termination 238-IVR can be coupled to marine non-impulsive sources operable in different frequency ranges associated with suffixes A, B, and C. The specific quantity of sources associated with each lead-in connection or front float, the specific quantity of sources operable in each of the different frequency ranges, and the specific quantity of different frequency ranges (A, B, C, D, and E) are used throughout the Figures and description herein as a consistent example for clarity of explanation rather than as a limitation to be read onto the disclosure. Different quantities can be used for different marine surveys.

In at least one embodiment, a lead in 242 can have a plurality of connections (also known as "take-outs"), and each connection can be connected to a streamer 220. As a result, one lead-in can tow a plurality of streamers. Similarly, with respect to front floats, one lead-in 242 can include a plurality of connections for front floats and can facilitate towing a plurality of front floats.

Figure 3:
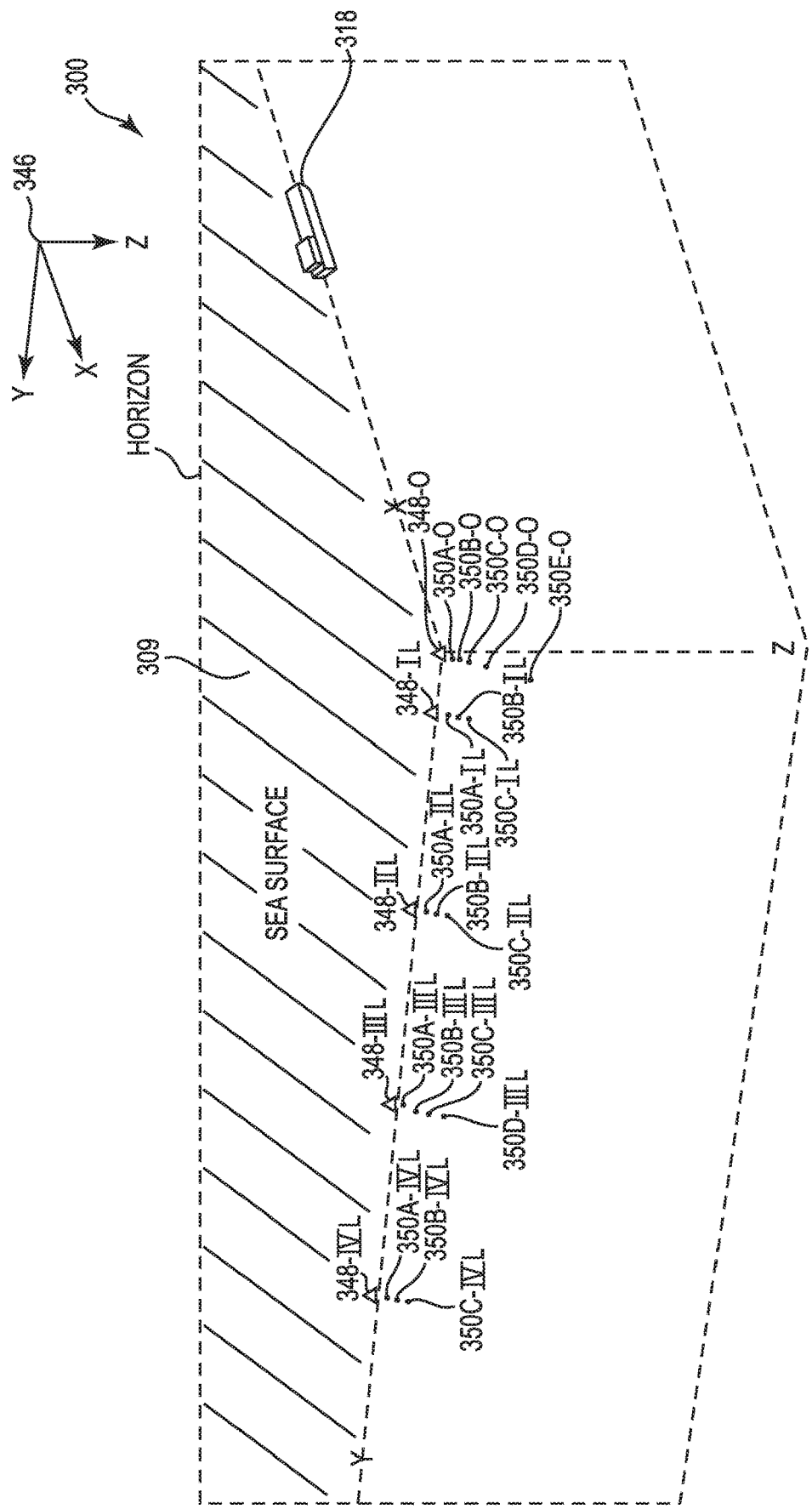
FIG. 3 illustrates a high perspective view including cutaway views in an xz-plane and a yz-plane of an exemplary embodiment of a marine survey system.

FIG. 3 illustrates a high perspective view including cutaway views in an xz-plane and a yz-plane of an exemplary embodiment of a marine survey system 300. A set of yxz-axes 346 and a horizon is included for reference. The marine survey vessel 318 is shown sailing on the sea surface 309 along the dotted line labeled "X" in a direction opposite of the arrow on the x-axis of the yxz-axes 346. Due to the perspective of FIG. 3, the right-hand side of the spread (see FIG. 2) is not illustrated. In at least one embodiment, the right-hand side of the spread can mirror the left-hand side of the spread. The view illustrated in FIG. 3 does not show any lines or similar towing equipment so that an example of the relative positions of the marine survey vessel, front floats 348, and marine non-impulsive sources 350 can be more clearly shown in three dimensions with respect to the sea surface 309 and in depth. The drawings are not to scale. The marine survey system 300 is analogous to the marine survey system 200 illustrated in FIG. 2, although different portions are shown due to perspective. Marine non-impulsive sources are generally designated with the reference numeral "50" with a figure number prefix, such as "350" in FIG. 3, and a suffix "A". The suffixes A, B, C, D, and E used herein can each be associated with different operable frequency ranges of marine non-impulsive sources, different depths of marine non-impulsive sources, and/or different sweep lengths of marine non-impulsive sources. The extensions designate the position of the marine non-impulsive source in the marine survey system 300. For example, the extension "-IVL" in the reference numeral "350A-IVL" indicates that the marine non-impulsive source 350A is associated with the fourth ("IV") set of marine non-impulsive sources on the left ("L") side of the marine survey vessel 318. This notation is used throughout the Figures herein. Several front floats 348 are illustrated, each of which can be coupled to a respective lead-in termination, connection point, or streamer. The front floats 348 can be coupled to marine non-impulsive sources 350. For example, the front float 348-IVL can be coupled to marine non-impulsive sources 350A-IVL, 350B-IVL, and 350C-IVL; the front float 348-IIIL can be coupled to marine non-impulsive sources 350A-IIIL, 350B-IIIL, 350C-IIIL, and 350D-IIIL; the front float 348-IIL can be coupled to marine non-impulsive sources 350A-IIL, 350B-IIL, and 350C-IIL; the front float 348-IL can be coupled to marine non-impulsive sources 350A-IL, 350B-IL, and 350C-IL; the front float 348-O can be coupled to marine non-impulsive sources 350A-O, 350B-O, 350C-O, 350D-O, and 350E-O.

The front floats 348 can each be coupled to various marine non-impulsive sources 350. In at least one embodiment, the marine non-impulsive sources 350 are marine vibrators such as benders. The marine non-impulsive sources 350 are associated with the marine survey system 300 and can include different marine non-impulsive sources operable in different frequency ranges. For example, the operating frequency range associated with the suffix A can include higher frequencies than the operating frequency range associated with the suffix B, which can include higher frequencies than operating frequency range associated with the suffix C, which can include higher frequencies than operating frequency range associated with the suffix D, which can include higher frequencies than operating frequency range associated with the suffix E.

Marine non-impulsive sources 350 of different operating frequency ranges can be towed and operated at different depths based on the operating frequency range. For example, the source depth associated with the suffix A can be shallower than the source depth associated with the suffix B, which can be shallower than the source depth associated with the suffix C, which can be shallower than the source depth associated with the suffix D, which can be shallower than the source depth associated with the suffix E. In at least one embodiment, marine non-impulsive sources 350 that operate at higher frequencies can be towed and operated at relatively shallower depths compared to marine non-impulsive sources 350 that operate at lower frequencies.

Marine non-impulsive sources 350 of different operating frequency ranges can be operated with different sweep lengths based on available geological information of a subsurface location that is the target of a marine seismic survey, the intended speed of the marine survey vessel 318, the depth of the marine non-impulsive sources 350, and the operating frequency range of the marine non-impulsive sources 350. For example, the sweep length associated with the suffix A can be shorter than the sweep length associated with the suffix B, which can be shorter than the sweep length associated with the suffix C, which can be shorter than the sweep length associated with the suffix D, which can be shorter than the sweep length associated with the suffix E. In at least one embodiment, marine non-impulsive sources 350 that operate at higher frequencies can be operated with relatively shorter sweep lengths compared to marine non-impulsive sources 350 that operate at lower frequencies.

In some instances, a marine surveyor may have access to different marine non-impulsive sources 350 that are capable of operating in different frequency ranges. For example, the marine surveyor may have access to five different models of marine non-impulsive sources 350 that each have a different operating frequency range (A, B, C, D, E). A marine seismic survey can be designed based on the respective operating frequency range of the different models, the respective energy output of the different models, an intended speed of a marine survey vessel 318, and available geological information of a subsurface location that is the target of the survey.

The depths at which the different models are to be towed can be based on the depth of the subsurface location, the frequency range for each model, and a ghost notch associated with operating of each model of marine non-impulsive source. Because the surface of a body of water reflects acoustic energy, source ghost effects created by sea surface reflections contaminate seismic data gathered by marine survey receivers. The source ghost effects result from portions of the acoustic energy being reflected from the sea surface before reaching the marine survey receivers and from acoustic energy that travels upward from the surface and is reflected by the sea surface before reaching the marine survey receivers. As a result, the marine survey receivers measure not only portions of the reflected wavefields that travel directly from the surface to the marine survey receivers, but also measure time-delayed (ghost) wavefields created by reflections at points on the sea surface. The combination of these measurements can result in ghost notches, which are an out-of-phase reflections that reduce or eliminate a signal at a particular frequency. The particular frequency at which the source ghost notch can occur is a frequency equal to the speed of sound in the medium (water) divided by two times the depth of the marine non-impulsive source multiplied by the cosine of the angle of incidence. The particular frequency at which a receiver ghost notch can occur is a frequency equal to the speed of sound in the medium divided by two times the depth of the receivers. Thus, the ghost notch can occur at higher frequencies for shallower depths and lower frequencies for deeper depths. It is desirable not to operate the marine non-impulsive source at a depth and frequency associated with the source ghost notch.

The following table is an example of a marine survey system 300 design for a marine survey vessel speed of 2.5 meters (m) per second (s):

TABLE 1

| Suffix | f Range | Depth | Energy | Quantity | Sampling Rate | Available Time |
|---|---|---|---|---|---|---|
| A | 48-96 Hz | 5 m | 200 dB | 9 | 7.8 m | ~3 s** |
| B | 24-48 Hz | 10 m | 200 dB | 9 | 15.6 m | ~6 s** |
| C | 12-24 Hz | 20 m | 200 dB | 9 | 31.2 m | ~12 s |
| D | 6-12 Hz | 40 m | 200 dB | 3 | 62.5 m | ~25 s |
| E | 3-6 Hz | 75 m | 194* dB | 2 | 125 m | ~50 s |

The values in the Table 1 are just examples and other values can be used for different marine non-impulsive sources and survey designs. The "f Range" indicates the operating frequency range of the marine non-impulsive sources associated with the corresponding suffix. The "Depth" indicates the depth at which the marine non-impulsive sources 350 associated with the corresponding suffix are towed. The "Energy" indicates a desired energy output at the subsurface location of each marine non-impulsive source 350 associated with the corresponding suffix in decibels (dB). The asterisks by the desired energy output of the marine non-impulsive source 350 associated with the suffix E indicates that the desired total energy output of both source units of the marine non-impulsive source 350E-O is 194 decibels. The "Quantity" indicates the quantity of marine non-impulsive sources 350 towed.

The "Sampling Rate" indicates the spatial sampling rate, which is a measure of how often (in distance) the sweep signal is to be repeated according to the design based on the frequency range of the marine non-impulsive sources 350, the depth of the subsurface location, the speed of sound in the medium, and the intended speed of the marine survey vessel 318. The "Sampling Rate" may therefore also be referred to as a flexible spatial sampling rate. The "Available Time" indicates the time available to produce the signature (operate the marine non-impulsive source with the sweep signal) and receive the signal reflected from the subsurface location based on the flexible spatial sampling rate (flexible bin size). In at least one embodiment, smaller bins can be used for higher frequencies and larger bins can be used for lower frequencies.

Although not specifically indicated in Table 1, the available time can be split into a sweep length and a two-way travel time. The two-way travel time is determined based on the depth of the subsurface location and the speed of sound in the media therebetween. The remainder of the available time can be used for the sweep length. For the example used in Table 1, the required two-way travel time is 10 seconds. Therefore, the double asterisks by the available time associated with the suffixes A and B indicates that there is insufficient available time. Any sweep length longer than the available time would cause frequency drift and result in missing frequencies on the subsurface bin level. This may be resolved by using a plurality of properly shifted simultaneous sources and near-continuous acquisition. Near-continuous acquisition can include near-continuous operation of a marine seismic source and near-continuous recording by receivers. As used herein, "near-continuous" can include without meaningful breaks. As would be understood by one of ordinary skill in the art with the benefit of this disclosure, operational circumstances can cause intermittent gaps (due to equipment failure, etc.), and "near-continuous" should be read to include acquisition with intermittent or periodic gaps, whether planned or unplanned, as well as without intermittent or periodic gaps, thus including "continuous acquisition." The available time associated with suffix C would only allow for a 2 second sweep length in combination with the 10 second two-way travel time, which may be insufficient to generate the desired energy output at the subsurface location using the marine non-impulsive sources in the 12-24 Hz frequency range. The available time associated with suffix D allows for a 15 second sweep length, which should be sufficient to generate the desired energy output at the subsurface location using the marine non-impulsive sources in the 6-12 Hz frequency range. The available time associated with the suffix E allows for a 40 second sweep length, which should be sufficient to generate the desired energy output at the subsurface location using the marine non-impulsive sources in the 3-6 Hz frequency range.

For a marine non-impulsive source 350 having a given energy output and a given frequency range, relatively shorter sweep lengths yield less energy at the subsurface location and relatively longer sweep lengths yield greater energy at the subsurface location. For a marine survey design having a given frequency range and a given sweep length for a marine non-impulsive source 350, the energy output can be increased by increasing a size of the marine non-impulsive source, which also increases the energy output at the subsurface location. For example, the size of the plates of the marine vibrator can be increased to increase its energy output. For a marine survey design having a given frequency range, a given energy output, and a given sweep length for a marine non-impulsive source 350, the energy output at the subsurface location (and accompanying SNR) can be increased by operating a greater quantity of the marine non-impulsive source 350 having the same frequency range, energy output, and sweep length. For marine survey designs that include the use of more than one marine non-impulsive source 350 operated with a same frequency range, sweep length, and energy output, the actuation of the different marine non-impulsive sources can be randomized versus each other, which allows for easier source separation during data processing.

In order to image a subsurface location, a minimum SNR is required, which can vary based on the geology of the subsurface location. A combination of the desired energy output and quantity of sources can be adjusted to give the desired SNR. The energy output from a given marine non-impulsive source 350 can be increased by using longer sweeps, however longer sweeps can lead to bin frequency drift. Lower frequencies generated by a particular marine non-impulsive source have longer wavelengths, however, it is more difficult to generate the lower frequencies. According to at least one embodiment of the present disclosure, the marine non-impulsive sources 350 can be separated into different frequency bandwidth regimes with different sweep lengths depending on the geology of the subsurface location that is the target of the marine survey. This can allow the marine survey vessel to move at a preferred speed.

Embodiments are not limited to these specific examples. Frequency ranges for the marine non-impulsive sources 350 as other frequency ranges can be used. In at least one embodiment, one or more of the frequency ranges of the marine non-impulsive sources 350 can at least partially overlap. In at least one embodiment, there can be frequency gaps between the different operating frequency ranges. Furthermore, marine non-impulsive sources 350 having lower or higher frequency ranges than those indicated in Table 1 can be used.

Figure 4B:
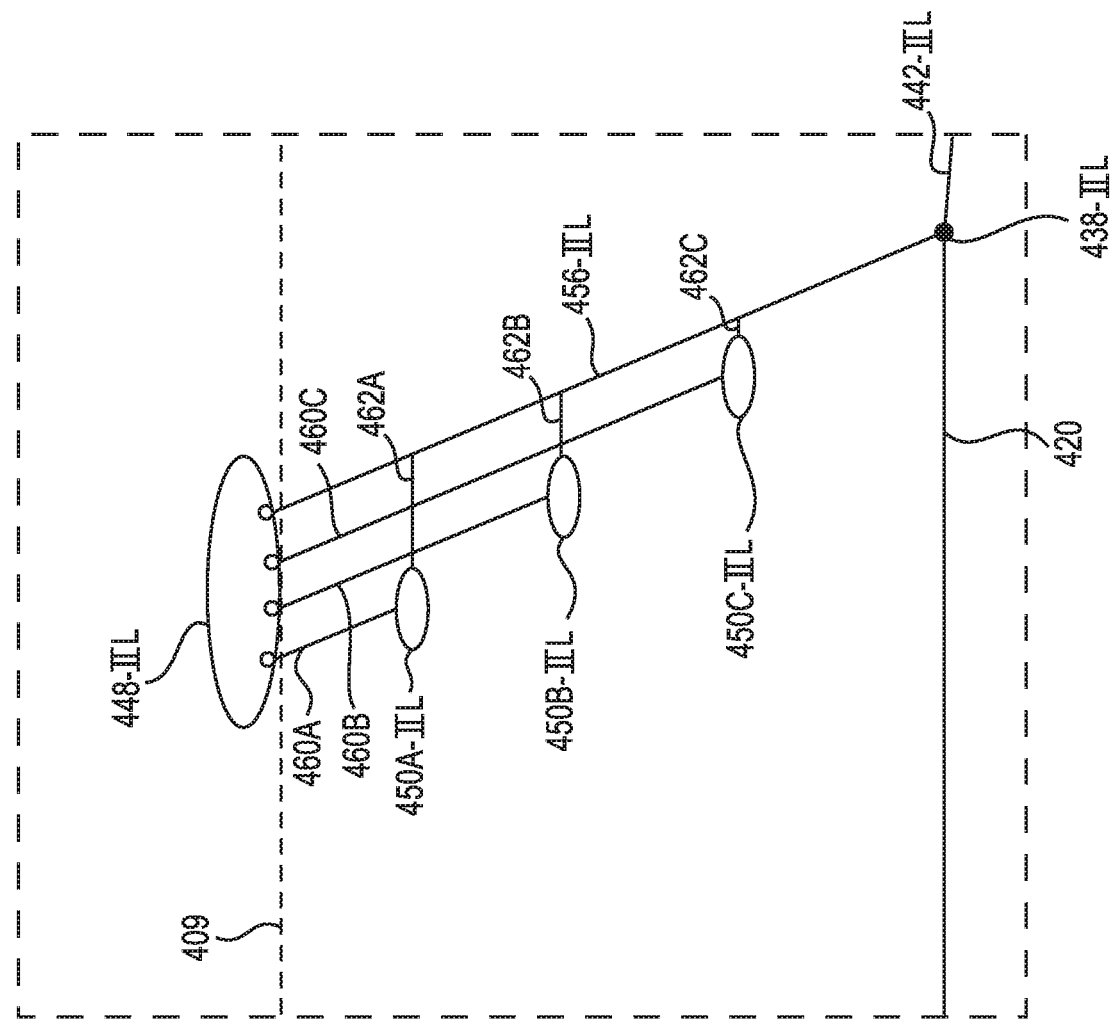
FIG. 4B illustrates a close-in elevation or xz-plane view of a portion of FIG. 4A.

FIG. 4A illustrates a low perspective cutaway view of an exemplary embodiment of a marine survey system 400. FIG. 4B illustrates a close-in elevation or xz-plane view of a portion of FIG. 4A. A set of yxz-axes 452 is included for reference. Although not specifically illustrated so as not to obscure other components, the marine survey system 400 can include paravanes, also known as deflectors, and spur lines, among other towing equipment. The marine survey system 400 is analogous to the marine survey system 200 illustrated in FIG. 2, although different portions are shown due to perspective.

Lead-ins 442 can extend away from a marine survey vessel (not shown in the figure but indicated as being to the right, off the page). The lead-ins 442 can also be connected to streamers that would extend to the left in the x-direction as shown in FIG. 4B, but not shown in FIG. 4A so as not to obscure the other elements shown. The lead-ins 442 are illustrated to the right of lead-in terminations 438. The lead-in terminations 438 and the connection point 444 are coupled by spreader lines, for example as illustrated by the spreader line 436 between the lead-in termination 438-IL and the connection point 444. Front floats 448 can be coupled to the lead-in terminations 438 or connection point 444 via float cables 456. However, in at least one embodiment, a front float 448 can be coupled to a lead-in 442 upstream of the lead-in termination 438. In at least one embodiment, a front float 448 can be coupled to a streamer 420 downstream of the lead-in termination 438. The front floats 448 can give buoyancy to other components coupled to the front floats 448, such as streamers 420, marine non-impulsive sources 450, or other equipment. The float cables 456 can house communication lines, power lines, or both. Power lines can accommodate transfer of electrical energy (e.g., power) to front floats 448 and/or marine non-impulsive sources 450. Communications lines can accommodate transfer of electrical, optical, or other communications.

The example illustrated includes the front float 448-O coupled to the connection point 444 by float cable 456-O, the front float 448-IL coupled to the lead-in termination 438-IL and to the lead-in 442-IL by the float cable 456-IL, the front float 448-IIL coupled to the lead-in termination 438-IIL and to the lead-in 442-IIL by the float cable 456-IIL, the front float 448-IIIL coupled to the lead-in termination 438-IIIL and to the lead-in 442-IIIL by the float cable 456-IIIL, and the front float 448-IVL coupled to the lead-in termination 438-IVL and to the lead-in 442-IVL by the float cable 456-IVL. The marine survey system 400 and can be arranged differently than illustrated in FIG. 4A.

The front floats 448 can be coupled to and support marine non-impulsive sources 450. In the example illustrated in FIGS. 4A-4B, the front float 448-O is coupled to marine non-impulsive sources 450A-O, 450B-O, and 450C-O, the front float 448-IL is coupled to marine non-impulsive sources 450A-IL, 450B-IL, and 450C-IL, the front float 448-IIL is coupled to marine non-impulsive sources 450A-IIL, 450B-IIL, and 450C-IIL, the front float 448-IIIL is coupled to marine non-impulsive sources 450A-IIIL, 450B-IIIL, and 450C-IIIL, and the front float 448-IVL is coupled to marine non-impulsive sources 450A-IVL, 450B-IVL, and 450C-IVL. As illustrated in more detail in FIG. 4B, a front float 448 can be coupled to a respective marine non-impulsive source 450 by a source cable 460, while the respective marine non-impulsive source 450 can also be coupled to the source cable 456 that connects the front float 448 to the lead-in termination 438 or connection point 444. The source cables 460 can house communication lines, power lines, or both. Winches (not illustrated in FIGS. 4A-4B) can also be present to adjust positioning of the streamers 420 and/or the marine non-impulsive sources 450. For instance, the front floats 448 can have one or more onboard winches to extend or retract the float cables 456 or the source cables 460.

Specifically, as illustrated in the example illustrated in FIG. 4B, the front float 448-IIL is coupled to a first marine non-impulsive source 450A-IIL by a first source cable 460A, to a second marine non-impulsive source 450B-IIL by a second source cable 460B, and to a third marine non-impulsive source 450C-IIL by a third source cable 460C. The first marine non-impulsive source 450A-IIL is also coupled to the float cable 456-IIL by a first source line 462A. The second marine non-impulsive source 450B-IIL is also coupled to the float cable 456-IIL by a second source line 462B. The third marine non-impulsive source 450C-IIL is also coupled to the float cable 456-IIL by a third source line 462C. Embodiments are not limited to the specific number of marine non-impulsive sources shown being connected to the front float 448-IIL by source cables 460, as embodiments can include more or fewer marine non-impulsive sources so coupled.

The source lines 462, in at least one embodiment, can be sliding collar tow ropes. Sliding collar tow ropes can be used to control positioning of the float cables 456 and source cables 460 and positioning of the marine non-impulsive sources 450, for instance, holding them in a desired position. As used herein, a sliding collar tow rope can include a rope with a cylinder, also known as a "sliding collar" that can slide up and down, for example, a float cable 456 when the marine non-impulsive sources 450 are hoisted or lowered by winches connected to the source cables 460.

Additional sources can be coupled to the lead-in terminations 438 or the connection point 444 by depressor cables 458 and source lines 462. The depressor cables 458 can be coupled to a depressor 454. As used herein, a depressor 454 can include a system component configured to weigh down another system component, for example, a depressor can be a weight or a hydrofoil. Specifically as illustrated in FIG. 4A, marine non-impulsive source 450D-O can be coupled to the depressor cable 458-O by the source line 462D, the marine non-impulsive source 450E-O can be coupled to the depressor cable 458-O by the source line 462E, and the marine non-impulsive source 450D-IIIL can be coupled to the depressor line 458-IIIL by a source line (not specifically illustrated). As illustrated, the additional sources 450 coupled by depressor cables 458 can extend below (deeper) than the lead-in terminations 438 or the connection point 444, and thus deeper than the sources coupled to the front floats 448. The marine non-impulsive source 450E-O is illustrated as including two individual marine non-impulsive source units in parallel coupled to the depressor cable 458-O by two source lines 462E (not individually labeled). In some embodiments, two or more marine non-impulsive source units can be towed in close proximity to each other and operated collectively as one source, for example, as illustrated with respect to the marine non-impulsive source 450E-O.

FIG. 5 illustrates an exemplary embodiment of a method flow diagram for survey design for data acquisition using marine non-impulsive sources. At block 564, the method can include operating a first marine non-impulsive source over a first frequency range on a first spatial sampling for a first sweep length, wherein the first sweep length is based on available geological information of a subsurface location comprising a target of a marine seismic survey, an intended speed of a marine survey vessel, the first spatial sampling, and the first frequency range. "Spatial sampling" refers to an amount of space sampled with the acoustic energy generated by operating the marine non-impulsive source and is related to the "spatial sampling rate" described herein.

At block 566, the method can include operating a second marine non-impulsive source over a second frequency range on a second spatial sampling for a second sweep length, wherein the second sweep length is based on the available geological information, the intended speed, the second spatial sampling, and the second frequency range. The available geological information can include at least one of a Q-factor associated with the subsurface location, a speed of sound associated with the subsurface location and/or any media between the subsurface location and the marine non-impulsive source, and a two-way travel time associated with the subsurface location. The sweep length is selected to be no longer in duration than the available time, determined based on a depth of the subsurface location and the speed of sound in media between the first marine non-impulsive source and the subsurface location, minus the two-way travel time. In at least one embodiment, the first marine non-impulsive source (or sources) can be operated at a first depth and the second marine non-impulsive source (or sources) can be operated at a second depth. The respective sweep lengths can be based at least in part on the respective depths.

Operating either the first or the second marine non-impulsive sources can include operating a quantity of first or second marine non-impulsive sources sufficient to provide a desired SNR at the subsurface location over the first or second frequency range with the first or second sweep length. In other words, the marine survey design can be such that a sufficient quantity of marine non-impulsive sources that operate in each frequency range is provided to yield the desired SNR at the subsurface location. In at least one embodiment, a minimum quantity of marine non-impulsive sources operating in each frequency range sufficient to provide the desired SNR at the subsurface location are used for the marine survey design. In at least one embodiment using a plurality of marine non-impulsive sources operating over a same frequency range, each of the plurality of marine non-impulsive sources can be operated with randomized start times relative to each other.

The method can include determining a frequency range at which to acquire data associated with the subsurface location based on the available geological information. For example, marine non-impulsive sources operable in a desired frequency range can be selected based on the available geological information. The data associated with the subsurface location can be acquired as a result of operation of the first marine non-impulsive source and the second marine non-impulsive source.

The first sweep length can be related to a shallowest subsurface location that is a target of the marine seismic survey and a required SNR associated therewith. The first frequency range can include the highest frequency used for the marine seismic survey. The shallowest subsurface location can be imaged by most or all frequencies used in the marine seismic survey. Higher frequencies are more attenuated with depth than lower frequencies. Thus, the frequency range available to image deeper subsurface locations is more limited and tends to have lower frequency content relative to the shallower subsurface locations.

The method can include operating a third (and a fourth, fifth, etc.) marine non-impulsive source at a third (and a fourth, fifth, etc.) depth over a third (and a fourth, fifth, etc.) frequency range for a third (and a fourth, fifth, etc.) sweep length during operation of the first and the second marine non-impulsive sources. Any additional marine non-impulsive sources (third, fourth, fifth, etc.) can be operated in response to a determined frequency range at which to acquire data associated with the subsurface location including frequencies outside of the first frequency range and the second frequency range.

Figure 6:
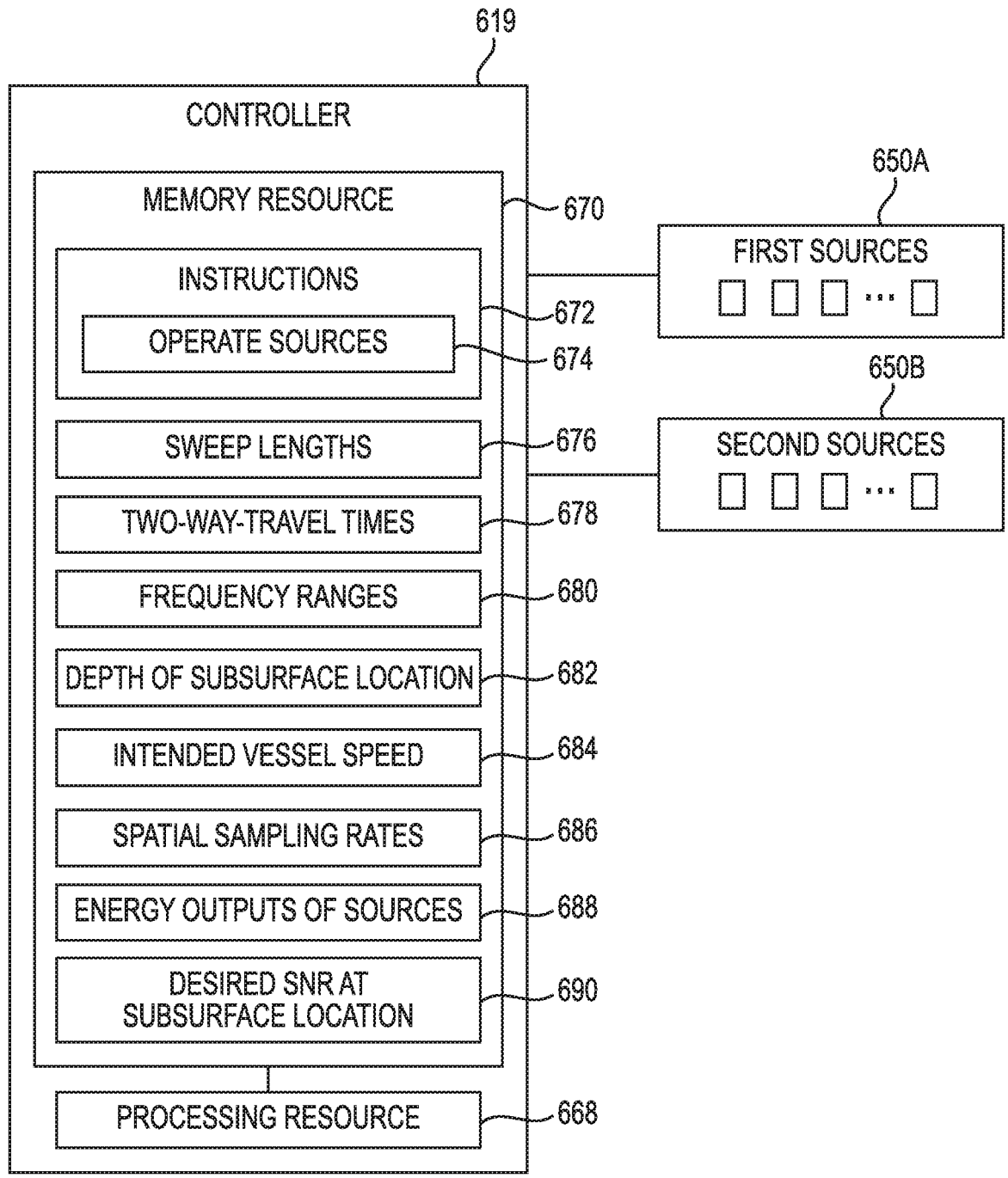
FIG. 6 illustrates an exemplary embodiment of a system for survey design for data acquisition using marine non-impulsive sources.

FIG. 6 illustrates a diagram of an exemplary embodiment of a system for survey design for data acquisition using marine non-impulsive sources. The system can include a controller 619 including or coupled to a memory resource 670, such as a machine-readable medium or other non-transitory memory resource 670. The memory resource 670 can be coupled to the controller 619 in a wired and/or wireless manner. For example, the memory resource 670 can be an internal memory, a portable memory, a portable disk, and/or a memory associated with another resource, for example, enabling machine-readable instructions to be transferred and/or executed across a network such as the Internet. The memory resource 670 can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media. The memory resource 670 can be internal and/or external to the controller 619. For example, the controller 619 can include internal memory resources and have access to external memory resources.

The controller 619 can include or be coupled to a processing resource 668, which can be internal or external to the controller 619. The processing resource 668 can be coupled to the memory resource 670 via a communication path. The communication path can be local or remote to the controller 619. Examples of a local communication path can include an electronic bus internal to a machine, where the memory resource 670 are in communication with the processing resource 668 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resource 670 are remote from the processing resource 668, such as in a network connection between the memory resource 670 and the processing resource 668. That is, the communication path can be a network connection. Examples of such a network connection can include a local area network, wide area network, personal area network, and the Internet, among others.

The memory resource 670 can store instructions 672, such as machine-readable instructions. The instructions 672 can be program instructions executable to implement a particular function. For example, the instructions 672 can be executable by the processing resource 668 to operate the first and second quantities of marine non-impulsive sources 650A, 650B as illustrated at 674. Although illustrated as including instructions 672, such as software, firmware, etc., executable by the processing resource 668, the controller 619, in at least one embodiment, can include hardware, such as hard-wired program logic, or a combination of hardware and program instructions configured to perform the functions described herein. Hardware is a physical component of a machine that enables it to perform a function. Examples of such hardware can include a field programmable gate array, an application specific integrated circuit, etc.

The controller 619 can be analogous to the controller 119 illustrated in FIG. 1. The controller can be coupled to and configured to operate a first quantity of marine non-impulsive sources 650A and a second quantity of marine non-impulsive sources 650B. The first quantity of marine non-impulsive sources 650A is analogous to the marine non-impulsive sources 350A-O, 350A-IL, 350A-IIL, 350A-IIIL, 350A-IVL and the second quantity of marine non-impulsive sources 650B is analogous to the marine non-impulsive sources 350B-O, 350B-IL, 350B-IIL, 350B-IIIL, 350B-IVL illustrated in FIG. 3. In other words, each quantity of marine non-impulsive sources 650A, 650B represents marine non-impulsive sources operable in respective frequency ranges and arranged to be towed at respective depths. Although not specifically illustrated, the controller 619 can be coupled to and configured to operate additional quantities of marine non-impulsive sources.

The memory resource 670 can store data, such as sweep lengths 676, two-way travel times 678, frequency ranges 680, depth of the subsurface location 682, intended vessel speed 684, spatial sampling rates 686, energy output of sources 688, and desired SNR 690 at a subsurface location. The stored data can be used by the controller 619 to operate the marine non-impulsive sources 650. The stored data can be an input to or an output of a determination that is made by the controller 619.

The controller 619 can be configured to operate each quantity of marine non-impulsive sources 650A, 650B with a respective sweep length 676 and a respective two-way travel time 678 between sweeps. The combination of each respective sweep length 676 and two-way travel time 678 can be based on an intended marine survey vessel speed 684 and a spatial sampling rate 686 according to the depth of the subsurface location 682 and respective frequency range 680 of the respective quantity of marine non-impulsive sources 650A, 650B. The respective sweep length 676 can be based on the respective frequency range 680, an energy output 688 of the respective quantity of marine non-impulsive sources 650A, 650B, and a respective desired SNR at the subsurface location 690 that is the target of the marine seismic survey. A respective depth at which each of the respective quantity of marine non-impulsive sources 650A, 650B is towed can be based on the depth of the subsurface location 682, the respective frequency range 680, and a respective ghost notch associated therewith.

In at least one embodiment, the respective quantities of marine non-impulsive sources 650A, 650B can each be a minimum quantity sufficient to provide the desired SNR at the subsurface location 690 within the combination of the respective sweep length 676 and respective two-way travel time 678. In at least one embodiment, the respective quantities of marine non-impulsive sources 650A, 650B can be at least a minimum quantity sufficient to provide the desired SNR at the subsurface location 690 within the combination of the respective sweep length 676 and respective two-way travel time 678. The minimum quantity can be determined by a user or by the controller 619 and output to a user.

Figure 7:
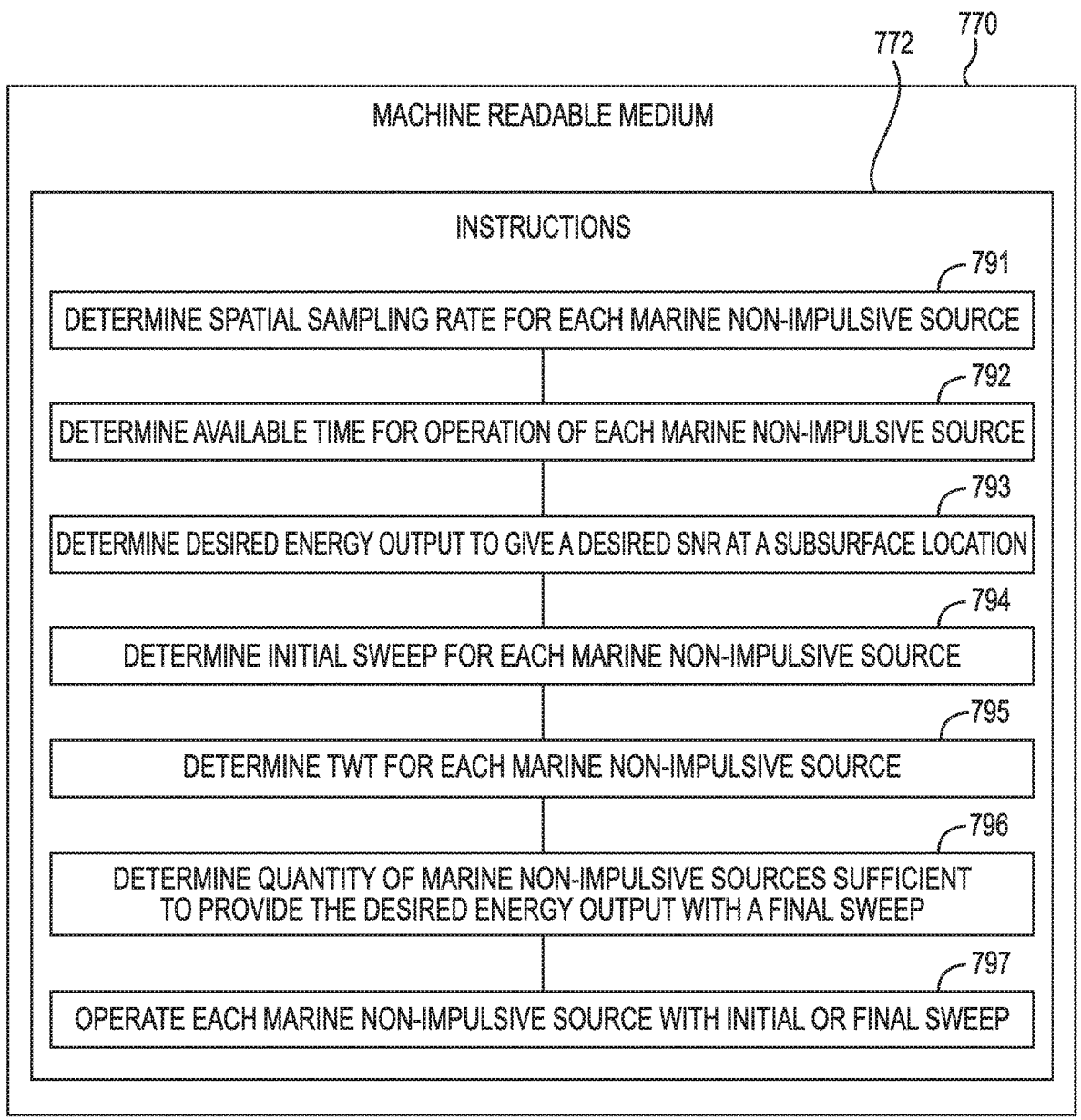
FIG. 7 illustrates a machine-readable medium for survey design for data acquisition using marine non-impulsive sources.

FIG. 7 illustrates a diagram of a machine-readable medium 770 for survey design for data acquisition using marine non-impulsive sources. The machine-readable medium 770 can store instructions 772, such as machine-readable instructions. The instructions 772 can be program instructions executable to implement a particular function. For example, the instructions 772 can be executable by the processing resource to determine a spatial sampling rate for each of a plurality of marine non-impulsive sources based on a respective frequency range and a respective depth of each of the plurality of marine non-impulsive sources as shown at block 791. As described with respect to FIG. 7, each of the plurality of marine non-impulsive sources can be configured to operate at a different frequency range. The depth at which each marine non-impulsive source is towed and operated can be predetermined based on the frequency range at which each marine non-impulsive source is to operate in order to avoid a ghost notch, as described herein. The frequency range of the respective marine non-impulsive sources is also a known or predetermined parameter based on the sources available to the marine surveyor. The spatial sampling rate can be determined based on these parameters as described herein with respect to FIG. 3.

The instructions 772 can be executed to determine a respective available time for operation of each of the plurality of marine non-impulsive sources based on the respective spatial sampling rate and an intended marine survey vessel speed as shown at block 792. The determination of the available time is described in more detail above with respect to FIG. 3. The instructions 772 can be executed to determine a respective desired energy output at the subsurface location, from modeling, to give a desired SNR at the subsurface location that is the target of the marine seismic survey for each of the plurality of marine non-impulsive sources as shown at block 793. The desired SNR can be predetermined by the marine surveyor based on the purpose of the marine seismic survey. Modeling of the subsurface location can be used to determine the desired energy output at that location to provide the predetermined SNR. The modeling can include estimates of geological information regarding the subsurface location as described herein.

The instructions 772 can be executed to determine a respective initial sweep length for each of the plurality of marine non-impulsive sources based on the respective desired energy output of each of the plurality of marine non-impulsive sources as shown at block 794. This initial sweep length is based on an assumption that only one of each of the plurality of marine non-impulsive sources is operating at the respective frequency range. The instructions 772 can be executed to determine a respective two-way travel time between each of the plurality of marine non-impulsive sources and the subsurface location as shown at block 795. For example, the two-way travel time can be measured from the end of the sweep to the time the data is received.

The instructions 772 can be executed to determine, in response to the respective available time being less than a sum of the respective two-way travel time and the respective initial sweep length, a respective quantity of the respective marine non-impulsive sources sufficient to provide the desired energy output with a final sweep length not greater than the respective available time minus the respective two-way travel time as shown at block 796. In other words, if the individual marine non-impulsive source configured to operate at a respective frequency range is incapable of generating the necessary energy output at the subsurface location using a sweep length short enough to allow for the two-way travel time to record the data, then additional marine non-impulsive sources operating at the same frequency range can be operated. The instructions 772 can be executed to operate each of the plurality of marine non-impulsive sources with the respective initial sweep lengths or to operate each of the plurality of marine non-impulsive sources and the quantity of the respective marine non-impulsive sources with the respective final sweep lengths as shown at block 797.

Although not specifically illustrated, the instructions 772 can be executed to receive an input, or more than one input, defining the respective energy output of each of the plurality of marine non-impulsive sources, the respective frequency range of each of the plurality of marine non-impulsive sources, the depth of the subsurface location, and the intended speed of the marine survey vessel. The input, or another input, can further define the respective depth of the plurality of marine non-impulsive sources. Alternatively, the instructions 772 can be executed to prescribe the respective depth of each of the plurality of marine non-impulsive sources based on the respective frequency range of each of the plurality of marine non-impulsive sources. The instructions to prescribing the depth can, for example, display the prescribed depth to a user for the purposes of marine seismic survey planning.

In accordance with a number of embodiments of the present disclosure, a geophysical data product may be manufactured. Geophysical data can be obtained by operating a first marine non-impulsive source at a first depth over a first frequency range for a first sweep length and by operating a second marine non-impulsive source at a second depth over a second frequency range for a second sweep length. The first sweep length is based on available geological information of a subsurface location that is a target of the marine seismic survey, an intended speed of a marine survey vessel, the first depth, and the first frequency range. The second seep length is based on the available geological information, the intended speed, the second depth, and the second frequency range. The geophysical data, such as reflected seismic signals, can be recorded in a tangible machine-readable medium, thereby completing the manufacture of the geophysical data product.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   operating one or more first marine non-impulsive sources, at a first depth, for a first sweep length over a first frequency range consistent with a first spatial sampling rate; and
   operating one or more second marine non-impulsive sources, at a second depth, for a second sweep length over a second frequency range consistent with a second spatial sampling rate;
   wherein the first sweep length is based on available geological information of a subsurface location comprising a target of a marine seismic survey, an intended speed of a marine survey vessel, the first spatial sampling rate, and the first frequency range;
   wherein the second sweep length is based on the available geological information, the intended speed, the second spatial sampling rate, and the second frequency range;
   wherein the first frequency range includes higher frequencies than does the second frequency range;
   wherein the first depth is shallower than the second depth;
   wherein the first and second spatial sampling rates correspond, respectively, to first and second spatial bin sizes;
   wherein the second spatial bin size is larger than the first spatial bin size; and
   wherein the one or more first marine non-impulsive sources comprise a sufficient number of source devices such that an aggregate output energy of the source devices provides a desired signal-to-noise ratio in signals received at receivers from the subsurface location responsive to the first sweep length.

2. The method of claim 1, wherein operating the one or more first marine non-impulsive sources comprises operating plural source devices at the first depth with randomized start times relative to each other.

3. The method of claim 1, wherein the available geological information includes at least one of a Q-factor associated with the subsurface location, a speed of sound associated with the subsurface location, and a two-way travel time associated with the subsurface location.

4. The method of claim 3, wherein the first sweep length is shorter in duration than a difference between an available time, determined based on a depth of the subsurface location and the speed of sound in media between the one or more first marine non-impulsive sources and the subsurface location, and the two-way travel time.

5. The method of claim 1, wherein the method includes determining a frequency range at which to acquire data associated with the subsurface location based on the available geological information.

6. The method of claim 1, further comprising operating one or more third marine non-impulsive sources over a third frequency range for a third sweep length during operation of the one or more first and the one or more second marine non-impulsive sources.

7. The method of claim 6, wherein the third frequency range includes at least some frequencies outside of the first frequency range and the second frequency range.

8. The method of claim 1, further comprising acquiring data associated with the subsurface location as a result of operation of the one or more first marine non-impulsive sources and the one or more second marine non-impulsive sources and recording the data in a tangible, non-volatile computer readable medium.

9. A system for a marine seismic survey, comprising:
   one or more first marine non-impulsive sources, each operable in a first frequency range and arranged to be towed at a first depth;
   one or more second marine non-impulsive sources, each operable in a second frequency range and arranged to be towed at a second depth; and
   a controller configured to:
     operate the one or more first marine non-impulsive sources with a first sweep length and with at least a first two-way travel time between sweeps; and
     operate the one or more second marine non-impulsive sources with a second sweep length and with at least a second two-way travel time between sweeps;
   wherein a combination of the first sweep length and the first two-way travel time is based on an intended marine survey vessel speed and a spatial sampling rate consistent with the first depth and the first frequency range;
   wherein the first sweep length is based on the first frequency range, an energy output of the one or more first marine non-impulsive sources, and a desired signal-to-noise ratio in signals received at receivers from a subsurface location comprising a target of the marine seismic survey;
   wherein the one or more first marine non-impulsive sources comprise source devices corresponding to one or more device types; and
   wherein a total number of the source devices corresponds to a minimum number sufficient to provide the desired signal-to-noise ratio within a constraint comprising a combination of the first sweep length and the first two-way travel time, given the device types.

10. The system of claim 9, wherein a combination of the second sweep length and the second two-way travel time is based on the intended marine survey vessel speed and a spatial sampling rate consistent with the second depth and the second frequency range; and
    wherein the second sweep length is based on the second frequency range, an energy output of the one or more second marine non-impulsive sources, and the desired signal-to-noise ratio.

11. The system of claim 9, wherein the controller is configured to operate the one or more first marine non-impulsive sources concurrently with operation of the one or more second marine non-impulsive sources.

12. A method, comprising:
    determining a respective spatial sampling rate for each of a plurality of marine non-impulsive sources based on a respective frequency range and a respective depth of each of the plurality of marine non-impulsive sources;
    determining a respective available time for operation of each of the plurality of marine non-impulsive sources based on the respective spatial sampling rate and an intended marine survey vessel speed;

determining a respective desired energy output from each of the plurality of marine non-impulsive sources to give a desired signal-to-noise ratio in signals received at receivers from a subsurface location comprising a target of a marine seismic survey;

determining a respective initial sweep length for each of the plurality of marine non-impulsive sources based on the respective desired energy output of each of the plurality of marine non-impulsive sources;

determining a respective two-way travel time between each of the plurality of marine non-impulsive sources and the subsurface location;

determining, in response to the respective available time being less than a sum of the respective two-way travel time and the respective initial sweep length, a respective quantity of the respective marine non-impulsive sources sufficient to provide the desired energy output with a respective final sweep length not greater than the respective available time minus the respective two-way travel time; and storing instructions in a controller or in a tangible, non-volatile, computer-readable medium that, if executed, would cause the controller to operate each of the plurality of marine non-impulsive sources with the respective initial sweep length or with the respective final sweep length.

13. The method of claim 12, further comprising receiving an input defining:

the respective energy output of each of the plurality of marine non-impulsive sources;

the respective frequency range of each of the plurality of marine non-impulsive sources;

the depth of the subsurface location; and the intended speed of the marine survey vessel.

14. The method of claim 13, wherein the input further defines the respective depth of each of the plurality of marine non-impulsive sources.

15. The method of claim 12, further comprising prescribing the respective depth of each of the plurality of marine non-impulsive sources based on the respective frequency range of each of the plurality of marine non-impulsive sources.

16. The method of claim 12, wherein:

determining the respective desired energy output is performed based at least in part on modeling the subsurface location using available geophysical information about the subsurface location.

17. The method of claim 12, further comprising:

operating each of the plurality of marine non-impulsive sources with the respective initial sweep length or with the respective final sweep length.

18. A method of performing a marine seismic survey, comprising:

operating one or more first non-impulsive source devices, at a first depth, for a first sweep length over a first frequency range;

operating one or more second non-impulsive source devices, at a second depth, for a second sweep length over a second frequency range;

wherein the first frequency range includes higher frequencies than does the second frequency range;

wherein the first depth is shallower than the second depth;

wherein the first frequency range is consistent with a first spatial sampling rate that corresponds to a first spatial bin size and the second frequency range is consistent with a second spatial sampling rate that corresponds to a second spatial bin size; and wherein the first spatial bin size is smaller than the second spatial bin size.

19. The method of claim 18, further comprising:

towing the one or more first and the one or more second non-impulsive source devices from one or more vessels traveling at a vessel speed over a subsurface comprising one or more imaging targets; and operating sufficient numbers of the one or more first and the one or more second non-impulsive source devices to achieve desired total energy outputs over the first and second frequency ranges at the one or more imaging targets given the vessel speed and the first and second spatial bin sizes.

20. The method of claim 19, wherein:

operating sufficient numbers of the one or more first and the one or more second non-impulsive sources devices comprises operating a minimum number of the one or more first non-impulsive source devices and a minimum number of the one or more second non-impulsive source devices necessary to achieve the desired total energy outputs.

21. The method of claim 18, wherein:

the one or more first and the one or more second non-impulsive source devices are associated, respectively, with first and second available times during which energy corresponding to the first and second sweep lengths must be emitted from the respective source devices, reflected from one or more imaging targets, and received at receivers; and wherein the first and second sweep lengths and a towing speed of the one or more first and the one or more second non-impulsive source devices are constrained to ensure that the first and second available times are met given the first and second spatial bin sizes.

22. The method of claim 18, wherein operating either of the one or more first and the one or more second non-impulsive source devices comprises:

operating plural non-impulsive source devices at a same depth over a same frequency range; and randomizing start times for the plural sources.

23. The method of claim 18, wherein:

the first and second sweep lengths at least partially overlap one other in time.

24. The method of claim 18, further comprising manufacturing a geophysical data product by:

receiving signals at receivers while operating the one or more first and the one or more second non-impulsive source devices; and recording the received signals or data representative of the received signals thereof in a tangible, non-volatile computer readable medium.

25. A method of performing a marine seismic survey, comprising:

towing one or more first and one or more second non-impulsive source devices from one or more vessels traveling at a vessel speed over a subsurface comprising one or more imaging targets;

operating the one or more first non-impulsive source devices for a first sweep length over a first frequency range, wherein the first frequency range is consistent with a first spatial sampling rate corresponding to a first spatial bin size; and operating the one or more second non-impulsive source devices for a second sweep length over a second frequency range, wherein the second frequency range is consistent with a second spatial sampling rate corresponding to a second spatial bin size different from the first spatial bin size;

wherein the one or more first and the one or more second non-impulsive source devices are associated, respectively, with first and second available times during which energy corresponding to the first and second sweep lengths must be emitted from the respective source devices, reflected from the one or more imaging targets, and received at receivers; and wherein the vessel speed and the first and second sweep lengths are constrained to ensure that the first and second available times are met given the first and second spatial bin sizes.

26. The method of claim 25, further comprising:

operating sufficient numbers of the one or more first and the one or more second non-impulsive source devices to achieve desired signal to noise ratios in signals received at receivers from the one or more imaging targets given the vessel speed and the first and second spatial bin sizes.

27. The method of claim 26, wherein:

operating sufficient numbers of the one or more first and the one or more second non-impulsive source devices comprises operating a minimum number of the one or more first non-impulsive source devices and a minimum number of the one or more second non-impulsive source devices necessary to achieve the desired signal to noise ratios given output energy characteristics of the one or more first and the one or more second non-impulsive source devices.

28. The method of claim 25:

further comprising towing the one or more first and the one or more second non-impulsive source devices at first and second respective depths;

wherein the first depth is shallower than the second depth;

wherein the first frequency range includes higher frequencies than does the second frequency range; and wherein the first spatial bin size is smaller than the second spatial bin size.

29. The method of claim 28, wherein operating either of the one or more first and the one or more second non-impulsive source devices comprises:

operating plural non-impulsive source devices at a same depth over a same frequency range; and randomizing start times for the plural source devices.

30. The method of claim 25, wherein:

the first and second sweep lengths at least partially overlap one other in time.

31. The method of claim 25, further comprising manufacturing a geophysical data product by:

receiving signals at receivers while operating the one or more first and the one or more second non-impulsive source devices; and recording the received signals or data representative of the received signals in a tangible, non-volatile computer readable medium.

\* \* \* \* \*